United States Patent
Morini et al.

(10) Patent No.: US 6,239,236 B1
(45) Date of Patent: May 29, 2001

(54) COMPONENTS AND CATALYSTS FOR THE POLYMERIZATION OF OLEFINS

(75) Inventors: Giampiero Morini, Padua (IT); Yuri V. Gulevich, Elkton, MD (US); Giulio Balbontin, Ferrara (IT)

(73) Assignee: Montell Technology Company B.V. (NL)

(*) Notice: Subject to any disclaimer, the term of this patent is extended or adjusted under 35 U.S.C. 154(b) by 0 days.

(21) Appl. No.: 09/663,335

(22) Filed: Sep. 18, 2000

Related U.S. Application Data

(62) Division of application No. 09/146,368, filed on Sep. 3, 1998, now Pat. No. 6,143,684.

(30) Foreign Application Priority Data

Sep. 3, 1997 (EP) .................................................. 97202707

(51) Int. Cl.$^7$ ...................................................... C08F 4/44
(52) U.S. Cl. ......................................................... 526/124.9
(58) Field of Search .......................................... 526/124.9

(56) References Cited

U.S. PATENT DOCUMENTS

| | | | |
|---|---|---|---|
| 4,297,465 | 10/1981 | Smith . | |
| 4,298,718 | 11/1981 | Mayr et al. . | |
| 4,399,054 | 8/1983 | Ferraris et al. . | |
| 4,495,338 | 1/1985 | Mayr et al. . | |
| 4,507,450 | * 3/1985 | Kakogawa et al. | 526/124.9 |
| 5,068,213 | * 11/1991 | Albizzati et al. | 526/124.9 |
| 6,143,684 | * 11/2000 | Morini et al. | 502/124 |

FOREIGN PATENT DOCUMENTS

| | | |
|---|---|---|
| 0 395 083 A2 | 10/1990 | (EP) . |
| 0 553 805 A1 | 8/1993 | (EP) . |
| 0 553 806 A1 | 8/1993 | (EP) . |
| 0 704 424 A1 | 4/1996 | (EP) . |
| 2 057 469 | 4/1981 | (GB) . |
| 55-116710 | * 9/1980 | (JP) ................................... 526/124.9 |
| 59-129210 | * 9/1980 | (JP) ................................... 526/124.9 |

OTHER PUBLICATIONS

Yano, et al., Supported Catalyst for Olefin Polymerization. The Role of the Third Component, *Eur. Polym. J.*, vol. 22(8), pp. 637–641 (1986).

* cited by examiner

*Primary Examiner*—Mark L. Bell
*Assistant Examiner*—J. Pasterczyk
(74) *Attorney, Agent, or Firm*—Bryan Cave LLP; Maurice B. Stiefel

(57) ABSTRACT

The invention relates to solid catalyst components for the polymerization of olefins $CH_2=CHR$, in which R is hydrogen or a hydrocarbyl radical with 1–12 carbon atoms, comprising Ti, Mg, halogen and an electron donor compound selected from cyanoesters of formula (I):

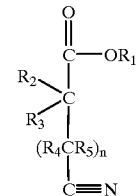

wherein $R_1$ is a $C_1-C_{20}$ linear or branched alkyl, alkenyl, cycloalkyl, cycloalkylalkyl, alkylcycloalkyl, aryl, arylalkyl or alkylaryl group; n is 0, 1, 2 or 3; $R_2$, $R_3$, $R_4$ and $R_5$ are independently selected from hydrogen or $C_1-C_{20}$ linear or branched alkyl, alkenyl, cycloalkyl, cycloalkylalkyl, alkylcycloalkyl, aryl, arylalkyl or alkylaryl groups; two or more of $R_2$ and $R_3$, and $R_4$ and $R_5$, can be joined to form a cycle. Said catalyst components when used in the polymerization of olefins are characterized by an excellent response to hydrogen and capability to produce polymers with broad Molecular Weight Distribution.

1 Claim, No Drawings

COMPONENTS AND CATALYSTS FOR THE POLYMERIZATION OF OLEFINS

CROSS REFERENCE TO RELATED APPLICATIONS

This application is a divisional of U.S. Ser. No. 09/146,368 filed Sep. 3, 1998, now U.S. Pat. No. 6,143,684.

The present invention relates to catalyst components for the polymerization of olefins, to the catalysts obtained therefrom and to the use of said catalysts in the polymerization of olefins CH$_2$=CHR in which R is hydrogen or a hydrocarbyl radical with 1–12 carbon atoms. In particular the present invention relates to catalyst components, suitable for the stereospecific polymerization of olefins, comprising titanium, Mg, halogen and an electron donor compound selected from cyanoesters having a particular formula. Said catalyst components when used in the polymerization of olefins, and in particular of propylene, are characterized by an excellent response to hydrogen and are also capable to give polymers with very broad molecular weight distribution.

Many patent applications have been filed in the field of the so-called high-yield polymerization catalysts, in particular regarding the catalysts for the polymerization of propylene. Typically, said catalysts comprise a solid catalyst component, constituted by a magnesium dichloride on which are supported a titanium compound and an internal electron donor compound (usually an ester of a phthalic acid), an Al-alkyl compound and an external donor (usually a silicon compound). The above catalyst systems, although capable of providing propylene polymers with high stereoregularity and in high yields, are also characterized by a poor capability of response to hydrogen. In other words, very high concentrations of hydrogen, used as molecular weight regulator, are necessary in order to obtain polymers with low molecular weight. The low molecular weight polymers are requested in applications where high fluidity in the molten state and good mechanical properties are necessary. The production of webs for non-woven fabrics, which is carried out by melt blown or spun bonded processes, is an example of such applications. In some cases, the molecular weights required for the propylene polymers are so low that, to produce them, the prior art catalyst systems would require a pressure of hydrogen well above the operative limit of conventional bulk polymerization plants. In these cases, such low molecular weight polymers are obtained by visbreaking of the high molecular weight polymers at high temperatures (200°–300° C.) and in the presence of free radical generators such as organic peroxides.

Moreover, the propylene polymers obtained with the above mentioned catalyst systems usually have a narrow molecular weight distribution (MWD) as compared for example with polyolefins prepared by using the conventional catalysts comprising a titanium trichloride based catalyst component. The narrow MWD causes a worsening of the processability of the polymers which involves a decrease of the quality of the products in applications such as molding or thermoforming. One of the approaches that have been tried to broaden the MWD comprises carrying out the polymerization in at least two steps under different polymerization conditions. However, these multisteps processes require a more complicated and sophisticated polymerization operation which increases the cost of the polymerization process.

Accordingly, there is still a need of a polymerization catalyst system with a good response to hydrogen and also capable of producing polymers with broad MWD.

It has now surprisingly been found that if specific cyanoesters are used as internal donor, catalyst components capable to give an excellent response to hydrogen are obtained. Very surprisingly said catalyst components, differently from what is known in the art, couple this feature with the capability of producing polymers with broad molecular weight distribution.

It is therefore an object of the present invention to provide a solid catalyst component for the polymerization of olefins CH$_2$=CHR in which R is hydrogen or a hydrocarbyl radical with 1–12 carbon atoms, comprising Ti, Mg, halogen and an electron donor compound selected from cyanoesters of formula (I):

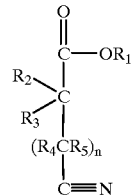

wherein R$_1$ is a C$_1$–C$_{20}$ linear or branched alkyl, alkenyl, cycloalkyl, cycloalkylalkyl, alkylcycloalkyl, aryl, arylalkyl or alkylaryl group; n is 0, 1, 2 or 3; R$_2$, R$_3$, R$_4$ and R$_5$ are independently selected from hydrogen or C$_1$–C$_{20}$ linear or branched alkyl, alkenyl, cycloalkyl, cycloalkylalkyl, alkylcycloalkyl, aryl, arylalkyl or alkylaryl groups; two or more of R$_2$ and R$_3$, and R$_4$ and R$_5$, can be joined to form a cycle.

Preferably R$_1$ is a C$_1$–C$_4$ linear alkyl group. In particular, R$_1$ is preferably selected from methyl or ethyl.

Among the compounds of formula (I) particularly preferred are those compounds in which n is 0. In this case one particularly preferred class is that in which one of R$_2$ or R$_3$ is hydrogen and the other is selected from C$_1$–C$_{20}$ linear or branched alkyl, alkenyl, cycloalkyl, cycloalkylalkyl, alkylcycloalkyl, aryl, arylalkyl or alkylaryl group and in particular from C$_1$–C$_8$ branched alkyl groups. Specific examples of preferred compounds of this latter class are methyl 2-i-butyl-cyanoacetate, ethyl 2-i-butyl-cyanoacetate, ethyl 2-i-propyl-cyanoacetate, ethyl 2-(1,2-dimethylpropyl)-cyanoacetate, ethyl 2-t-butyl-cyanoacetate.

Among the compounds in which n is 0 particularly preferred is the class in which both R$_2$ and R$_3$ are selected from C$_1$–C$_{20}$ linear or branched alkyl, alkenyl, cycloalkyl, cycloalkylalkyl, alkylcycloalkyl, aryl, arylalkyl or alkylaryl groups in which R$_2$ and R$_3$ can also form a cycle. Particularly preferred are the compounds in which both R$_2$ and R$_3$, equal or different to each other, are selected from C$_1$–C$_8$ linear or branched alkyl or aryl groups. Specific examples of preferred compounds of this class are ethyl 2,2-di-n-butyl-cyanoacetate, ethyl 2-i-butyl-2-n-butyl-cyanoacetate, ethyl 2,2-di-i-butyl-cyanoacetate, ethyl 2-i-butyl-2-i-propyl-cyanoacetate, ethyl 2,2-di-i-propyl-cyanoacetate, ethyl 2,2-di-benzyl ethyl-cyanoacetate.

As explained above, the catalyst component comprises, in addition to the above electron donor, Ti, Mg and halogen. In particular, the catalyst component comprises a titanium compound, having at least a Ti-halogen bond, and the above mentioned electron donor compound supported on a Mg halide. The magnesium halide is preferably MgCl$_2$ in active form that is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$, furthermore, also Ti-haloalcoholates of formula $Ti(OR)_{n-y}X_y$, where n is the valence of titanium and y is a number between 1 and n, can be used.

The preparation of the solid catalyst component can be carried out according to several methods.

According to one of these methods, the magnesium dichloride in an anhydrous state and the electron donor compound of formula (I) are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the electron donor compound of formula (I) is treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated with an excess of $TiCl_4$ at a temperature of about 80 to 135° C. which contains, in solution, an electron donor compound of formula (I). The treatment with $TiCl_4$ is repeated and the solid is washed with hexane in order to eliminate any non-reacted $TiCl_4$.

A further method comprises the reaction between magnesium alcoholates or chloroalcoholates (in particular chloroalcoholates prepared according to U.S. Pat. No. 4,220,554) and an excess of $TiCl_4$ comprising the electron donor compound of formula (I) in solution at a temperature of about 80 to 120° C.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0,1 and 6, preferably from 2 to 4, and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.). Then, the emulsion is quickly quenched, thereby causing the solidification of the adduct in form of spherical particles. Examples of spherical adducts prepared according to this procedure are described in U.S. Pat. No. 4,399,054. The so obtained adduct can be directly reacted with the Ti compound or it can be previously subjected to thermal controlled dealcoholation (80–130° C.) so as to obtain an adduct in which the number of moles of alcohol is generally lower than 2.8 preferably between 0,1 and 2,5. The reaction with the Ti compound can be carried out by suspending the adduct (dealcoholated or as such) in cold $TiCl_4$ (generally 0° C.); the mixture is heated up to 80–130° C. and kept at this temperature for 0,5–2 hours. The treatment with $TiCl_4$ can be carried out one or more times. The electron donor compound of formula (I) can be added during the treatment with $TiCl_4$. The treatment with the electron donor compound can be repeated one or more times.

The preparation of catalyst components in spherical form is described for example in European Patent Applications EP-A-395083, EP-A-553805, and EP-A-553806.

The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0,2 $cm^3/g$ preferably between 0,2 and 0,6 $cm^3/g$.

A further method to prepare the solid catalyst component of the invention comprises halogenating magnesium dihydrocarbyloxide compounds, such as magnesium dialkoxide or diaryloxide, with solution of $TiCl_4$ in aromatic hydrocarbon (such as toluene, xylene etc.) at temperatures between 80 and 130° C. The treatment with $TiCl_4$ in aromatic hydrocarbon solution can be repeated one or more times, and the electron donor compound of formula (I) is added during one or more of these treatments.

In any of these preparation methods the desired electron donor compound of formula (I) can be added as such or, in an alternative way, it can be obtained in situ by using an appropriate precursor capable to be transformed in the desired electron donor compound by means, for example, of known chemical reactions such as esterification, transesterification etc. Generally, the electron donor compound of formula (I) is used in molar ratio with respect to the $MgCl_2$ of from 00.1 to 1 preferably from 0,05 to 0,5.

The solid catalyst component according to the present invention are converted into catalysts for the polymerization of olefins by reacting them with organoaluminum compounds according to known methods.

In particular, it is an object of the present invention a catalyst for the polymerization of olefins $CH_2$=CHR, in which R is hydrogen or a hydrocarbyl radical with 1–12 carbon atoms, comprising the product of the reaction between:

(i) a solid catalyst component comprising a Ti, Mg, halogen and an electron donor compound selected from cyanoesters of formula (I):

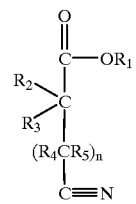

wherein $R_1$ is a $C_1$–$C_{20}$ linear or branched alkyl, alkenyl, cycloalkyl, cycloalkylalkyl, alkylcycloalkyl, aryl, arylalkyl or alkylaryl group; n is 0, 1, 2 or 3; $R_2$, $R_3$, $R_4$ and $R_5$ are independently selected from hydrogen or $C_1$–$C_{20}$ linear or branched alkyl, alkenyl, cycloalkyl, cycloalkylalkyl, alkylcycloalkyl, aryl, arylalkyl or alkylaryl group; two or more of $R_2$ and $R_3$, and $R_4$ and $R_5$, can be joined to form a cycle;

(ii) an alkylaluminum compound and, optionally
(iii) an electron-donor compound (external donor).

The alkyl-Al compound (ii) is preferably chosen among the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum compounds with alkylaluminum halides, alkylaluminum hydrides or alkylaluminum sesquichlorides such as AlEt$_2$Cl and Al$_2$Et$_3$Cl$_3$.

The external donor (iii) can be of the same type or it can be different from the internal donor of formula (I). Suitable external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers of the general formula

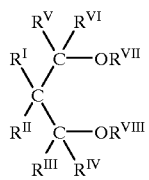
(II)

wherein $R^I$, $R^{II}$, $R^{III}$, $R^{IV}$, $R^V$ and $R^{VI}$ equal or different to each other, are hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; one or more of the $R^I$–$R^{VIII}$ groups can be linked to form a cycle. Particularly preferred are the 1,3-diethers in which $R^{VII}$ and $R^{VIII}$ are selected from C$_1$–C$_4$ alkyl radicals.

Another class of preferred external donor compounds is that of silicon compounds of formula $R_a^6 R_b^7 Si(OR^8)_c$, where a and b are integer from 0 to 2, c is an integer from 1 to 3 and the sum (a+b+c) is 4; $R^6$, $R^7$, and $R^8$, are alkyl, cycloalkyl or aryl radicals with 1–18 carbon atoms optionally containing heteroatoms. Particularly preferred are the silicon compounds in which a is 1, b is 1, c is 2, at least one of $R^6$ and $R^7$ is selected from branched alkyl, cycloalkyl or aryl groups with 3–10 carbon atoms optionally containing heteroatoms and $R^8$ is a C$_1$–C$_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane. Moreover, are also preferred the silicon compounds in which a is 0, c is 3, $R^7$ is a branched alkyl or cycloalkyl group, optionally containing heteroatoms, and $R^8$ is methyl. Examples of such preferred silicon compounds are cyclohexyltrimethoxysilane, t-butyltrimethoxysilane and thexyltrimethoxysilane.

The electron donor compound (iii) is used in such an amount to give a molar ratio between the organoaluminum compound and said electron donor compound (iii) of from 0.1 to 500, preferably from 1 to 300 and more preferably from 3 to 100. As previously indicated, when used in the polymerization of olefins, and in particular of propylene, the catalysts of the invention allow to obtain, with acceptable yields and isotactic indexes (expressed by xylene insolubility X.I.), a response to hydrogen concentrations (expressed by the high values of Melt Index "L") and a MWD (expressed by the values of the Polydispersity Index "PI") higher than those of the catalysts of the prior art.

Therefore, it constitutes a further object of the present invention a process for the (co)polymerization of olefins CH$_2$=CHR, in which R is hydrogen or a hydrocarbyl radical with 1–12 carbon atoms, carried out in the presence of a catalyst comprising the product of the reaction between:
a solid catalyst component comprising Ti, Mg, halogen and
  an electron donor compound selected from cyanoesters of formula (I):

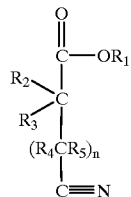

wherein R$_1$ is a C$_1$–C$_{20}$ linear or branched alkyl, alkenyl, cycloalkyl, cycloalkylalkyl, alkylcycloalkyl, aryl, arylalkyl or alkylaryl group; n is 0, 1, 2 or 3; R$_2$, R$_3$, R$_4$ and R$_5$ are independently selected from hydrogen or C$_1$–C$_{20}$ linear or branched alkyl, alkenyl, cycloalkyl, cycloalkylalkyl, alkylcycloalkyl, aryl, arylalkyl or alkylaryl group; two or more of R$_2$ and R$_3$, and R$_4$ and R$_5$, can be joined to form a cycle;
(ii) an alkylaluminum compound and,
(iii) an electron-donor compound (external donor).

The polymerization process can be carried out according to known techniques for example slurry polymerization using as diluent an inert hydrocarbon solvent, or bulk polymerization using the liquid monomer (for example propylene) as a reaction medium. Moreover, it is possible to carry out the polymerization process in gas-phase operating in one or more fluidized or mechanically agitated bed reactors.

The polymerization is generally carried out at temperature of from 20 to 150° C., preferably of from 40 to 80° C. When the polymerization is carried out in gas-phase the operating pressure is generally between 0.5 and 5 MPa, preferably between 1 and 4 MPa. In the bulk polymerization the operating pressure is generally between 1 and 8 MPa preferably between 1.5 and 5 MPa.

The following examples are given in order to better illustrate the invention without limiting it.

CHARACTERIZATIONS

The cyanoacetates according to formula (I) used in the present invention can be prepared, for example, by reaction of ethyl cyanoacetate with alkyl halides in the presence of a base such as sodium ethoxide. According to another synthesis, monosubstituted cyanoacetates are obtained by reacting ethyl cyanoacetate with a ketone or with an aldehyde (Knoevenagel condensation) to give unsaturated cyanoacetates that can be reduced with H$_2$ in the presence of Pd or Pt based catalysts. Alternatively, the unsaturated cyanoacetate can be reacted with Grignard reagents in the presence of CuCl.

Propylene General Polymerization Procedure

In a 4 liter autoclave, purged with nitrogen flow at 70° C. for one hour, 80 ml of anhydrous hexane containing 10 mg of solid catalyst component, 7 mmoles of AlEt$_3$ and 0.35 mmoles of dicyclopentyldimethoxysilane were introduced in propylene flow at 30° C. The autoclave was closed, 3 NL of hydrogen were added and then, under stirring, 1.2 Kg of liquid propylene were fed. The temperature was raised to 70° C. in five minutes and the polymerization was carried out at this temperature for two hours. The unreacted propylene was removed, the polymer was recovered and dried at 70° C. under vacuum for three hours, and then it was weighed and fractionated with o-xylene to determine the amount of the xylene insoluble (X.I.) fraction at 25° C.

Determination of X.I.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference, the X.I.%.

Determination of Polydispersity Index "P.I."

This property is strictly connected with the molecular weight distribution of the polymer under examination. In particular it is inversely proportional to the creep resistance of the polymer in the molten state. Said resistance called modulus separation at low modulus value (500 Pa), was determined at a temperature of 200° C. by using a parallel plates rheometer model RMS-800 marketed by RHEOMETRICS (USA), operating at an oscillation frequency which increases from 0.1 rad/sec to 100 rad/second. From the modulus separation value, one can derive the P.I. by way of the equation:

P.I: =54.6*(modulus separation)$^{-1.76}$ in which the modulus separation is defined as:

modulus separation=frequency at G'=500 Pa/frequency at G"=500 Pa wherein G' is storage modulus and G" is the loss modulus.

Determination of Melt Index

ASTM D 1238 condition "L"

EXAMPLES

Examples 1–12

Preparation of Solid Catalyst Components

Into a 500 ml four-necked round flask, purged with nitrogen, 225 ml of $TiCl_4$ were introduced at 0° C. While stirring, 10.3 g of microspheroidal $MgCl_2.2.1C_2H_5OH$ (obtained by partial thermal dealcoholation of an adduct prepared as described in Ex. 2 of U.S. Pat. No. 4,399,054 but operating at 3,000 rpm instead of 10,000) were added. The flask was heated to 40° C. and 9 mmoles of cyanoester were thereupon added. The temperature was raised to 100° C. and maintained for two hours, then the stirring was discontinued, the solid product was allowed to settle and the supernatant liquid was siphoned off.

200 ml of fresh $TiCl_4$ were added, the mixture was reacted at 120° C. for one hour and then the supernatant liquid was siphoned off. The solid was washed six times with anhydrous hexane (6×100 ml) at 60° C. and then dried under vacuum: the cyanoesters used, the amount of Ti (wt %) and of cyanoesters (wt %) contained in the solid catalyst component are reported in table 1. The polymerization results are reported in table 2.

Comparative Examples 1–2

Preparation of Solid Catalyst Component

The catalyst components have been prepared according to the same procedure of the examples 1–12 except for the fact that donors different from cyanoesters of formula (I) were used. The donors used, the amount of Ti (wt %) and of donors (wt %) contained in the solid catalyst component are reported in table 1. The polymerization results are reported in table 2.

Example 13

The same solid catalyst component and polymerization procedure of example 7 have been used with the only difference that 2.3 mmoles of 4-ethoxy ethyl-benzoate was used as external donor instead of dicyclopentyldimethoxysilane.

Comparative Example 3

The same polymerization procedure according to Example 13 was carried out but using the catalyst component of comparison example 2.

TABLE 1

| Solid catalyst component preparation | | Solid catalyst component composition | |
|---|---|---|---|
| Ex. n. | Donor type | Ti wt. % | Donor wt % |
| 1 | methyl 2-i-butyl-cyanoacetate | 4.7 | 3.6 |
| 2 | ethyl 2-i-butyl-cyanoacetate | 3.7 | 10.6 |
| 3 | ethyl 2-i-propyl-cyanoacetate | 4.5 | 12.5 |
| 4 | ethyl 2-t-butyl-cyanoacetate | 2.8 | 10.4 |
| 5 | ethyl 2,2di-n-butyl-cyanoacetate | 5.5 | 9.9 |
| 6 | ethyl 2-i-butyl-2-n-butyl-cyanoacetate | 5.1 | 9.1 |
| 7 | ethyl 2,2di-i-butyl-cyanoacetate | 4.7 | 6.4 |
| 8 | ethyl 2-i-propyl-2-n-butyl-cyanoacetate | 5.0 | 9.8 |
| 9 | ethyl 2-i-butyl-2-i-propyl-cyanoacetate | 4.1 | 7.9 |
| 10 | ethyl 2,2di-i-propyl-cyanoacetate | 3.9 | 9.0 |
| 11 | ethyl 2,2di-benzyl-cyanoacetate | 4.8 | 10.9 |
| 12 | ethyl 3,3-dimethyl-4-cyanobutyrate | 3.4 | 3 |
| comp.1 | di-isobutyl phthalate | 2.5 | 7.4 |
| comp.2 | ethyl benzoate | 3.5 | 9.1 |
| 13 | ethyl 2,2di-i-butyl-cyanoacetate | 4.7 | 6.4 |
| comp.3 | ethyl benzoate | 3.5 | 9.1 |

TABLE 2

| Example | MFR g/10' | P.I. | Yield KgPP/gCat | X.I. % |
|---|---|---|---|---|
| 1 | 22 | n.d. | 12 | 95.2 |
| 2 | 12 | 5.5 | 11 | 95.4 |
| 3 | 11.4 | n.d. | 13.5 | 93.2 |
| 4 | 12.5 | 5.4 | 15 | 93 |
| 5 | 12.7 | n.d. | 26.6 | 93.2 |
| 6 | 11 | 5. | 27.5 | 92.1 |
| 7 | 12 | n.d. | 23 | 93.2 |
| 8 | 12.3 | 4.9 | 26 | 93 |
| 9 | 34.6 | n.d. | 30.2 | 94.1 |
| 10 | 11 | 4.9. | 33 | 93.7 |
| 11 | 17.8 | n.d. | 24.3 | 94 |
| 12 | 16 | 5 | 14 | 95.4 |
| comp.1 | 5 | 4.3 | 50 | 98 |
| comp.2 | 6 | 4.4 | 25 | 92 |
| 13 | 34 | 6.5 | 15 | 93 |
| comp.3 | 2.0 | 5.3 | 20 | 94 |

What is claimed is:

1. An olefin (co)polymerization process comprising contacting olefins of the formula $CH_2$=CHR, in which R is hydrogen or a hydrocarbyl radical of 1 to 12 carbon atoms, with a catalyst comprising Ti, Mg, halogen, and a cyanoester electron donor compound of the formula (I):

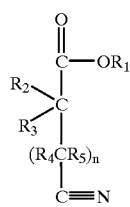

(I)

wherein $R_1$ is a $C_1$ to $C_{20}$ linear or branched alkyl, alkenyl, cycloalkyl, cycloalkylalkyl, alkylcycloalkyl, aryl, arylalkyl, or alkylaryl group; n is 0, 1, 2 or 3; $R_2$, $R_3$, $R_4$ and $R_5$ are independently selected from the group consisting of hydrogen and $C_1$–$C_{20}$ linear and branched alkyl, alkenyl, cycloalkyl, cycloalkylalkyl, alkylcycloalkyl, aryl, arylalkyl, and alkylaryl groups, and two or more of $R_2$ and $R_3$, and $R_4$ and $R_5$, can be joined together to form a cyclic group.

* * * * *